（12) United States Patent
Devries et al.

(10) Patent No.: US 8,192,878 B2
(45) Date of Patent: Jun. 5, 2012

(54) METHOD AND ALGORITHM TO DETECT FROZEN ANODE PRESSURE SENSOR

(75) Inventors: Loren Devries, Rochester, NY (US); Bruce J. Clingerman, Palmyra, NY (US); Abdullah B. Alp, West Henrietta, NY (US); Aaron Rogahn, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 799 days.

(21) Appl. No.: 12/362,347

(22) Filed: Jan. 29, 2009

(65) Prior Publication Data

US 2010/0190079 A1   Jul. 29, 2010

(51) Int. Cl.
*H01M 8/06* (2006.01)
(52) U.S. Cl. ........ 429/427; 429/428; 429/429; 429/430; 429/431; 429/432; 429/443; 429/446
(58) Field of Classification Search .................. 429/427, 429/428, 429, 430, 431, 432, 443, 446
See application file for complete search history.

(56) References Cited

U.S. PATENT DOCUMENTS

2007/0166582 A1*  7/2007 Okamoto .................. 429/22

\* cited by examiner

*Primary Examiner* — Patrick Ryan
*Assistant Examiner* — Ben Lewis
(74) *Attorney, Agent, or Firm* — John A. Miller; Miller IP Group, PLC

(57) ABSTRACT

A method for performing a plausibility check of a fuel cell stack anode side pressure sensor to determine whether the pressure sensor is providing an accurate measurement. Prior to system start-up when a cathode side compressor is not providing cathode air to a fuel cell stack, and the cathode side of the stack is at ambient pressure, a pressure measurement from a differential pressure sensor between the anode side and the cathode side of the fuel cell stack is provided. The differential pressure sensor reading is added to a pressure measurement from an ambient pressure sensor, where the sum should be about the same as the pressure measurement from the anode side pressure sensor if the anode side pressure sensor is operating properly.

15 Claims, 1 Drawing Sheet

METHOD AND ALGORITHM TO DETECT FROZEN ANODE PRESSURE SENSOR

BACKGROUND OF THE INVENTION

1. Field of the Invention

This invention relates generally to a system and method for determining whether an anode pressure sensor in a fuel cell system is operating properly and, more particularly to a system and method for determining whether an anode pressure sensor in a fuel cell system is operating properly by comparing the anode pressure sensor reading to the sum of an ambient pressure sensor measurement and a differential pressure sensor measurement between the anode and the cathode.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of and back into the stack. The bipolar plates also include flow channels through which a cooling fluid flows.

As is well understood in the art, the membranes within a fuel cell need to have a certain relative humidity so that the ionic resistance across the membrane is low enough to effectively conduct protons. This humidification may come from the stack water by-product or external humidification. During operation of the fuel cell stack, water by-product and external humidification may enter the anode and cathode flow channels, and may accumulate within the anode or cathode gas flow channels.

Typically, it is necessary to operate a fuel cell stack so the anode side of the stack is at a slightly higher pressure than the cathode side of the stack. Reasons for keeping the anode side pressure slightly higher than the cathode side include reducing the amount of nitrogen crossover that occurs across the MEA and preventing cathode exhaust gas from getting in the anode side during a bleed event. In order to insure that the proper pressures are present, the fuel cell system typically employs a cathode pressure sensor for measuring the pressure of the cathode side of the fuel cell stack, an anode pressure sensor for measuring the pressure of the anode side of the fuel cell stack, and a differential pressure sensor for measuring the pressure difference between the cathode side and the anode side of the fuel cell stack.

Liquid water in the anode and cathode side of the fuel cell stack may freeze and form ice. Sometimes this ice can form on and around the anode side pressure sensor, which affects its ability to provide a proper pressure reading. Therefore, during the next system start-up, a frozen anode pressure sensor may give an inaccurate reading indicating that the anode side pressure is too high or too low, or a proper pressure measurement when the anode side pressure is actually too high or too low. If an improper anode side pressure reading is given and the anode pressure is too high, excess hydrogen could be lost and system failures could occur as a result of components breaking. A low pressure anode side could lead to a rapid destruction of the cathode side catalyst.

SUMMARY OF THE INVENTION

In accordance with the teachings of the present invention, a method is disclosed for performing a plausibility check of a fuel cell stack anode side pressure sensor to determine whether the pressure sensor is providing an accurate measurement. Prior to system start-up when a cathode side compressor is not providing cathode air to a fuel cell stack, and the cathode side of the stack is at ambient pressure, a pressure measurement from a differential pressure sensor between the anode side and the cathode side of the fuel cell stack is provided. The differential pressure sensor reading is added to a pressure measurement from an ambient pressure sensor, where the sum should be about the same as the pressure measurement from the anode side pressure sensor if the anode side pressure sensor is operating properly.

Additional features of the present invention will become apparent from the following description and appended claims, taken in conjunction with the accompanying drawings.

DETAILED DESCRIPTION OF THE EMBODIMENTS

Figure 1:
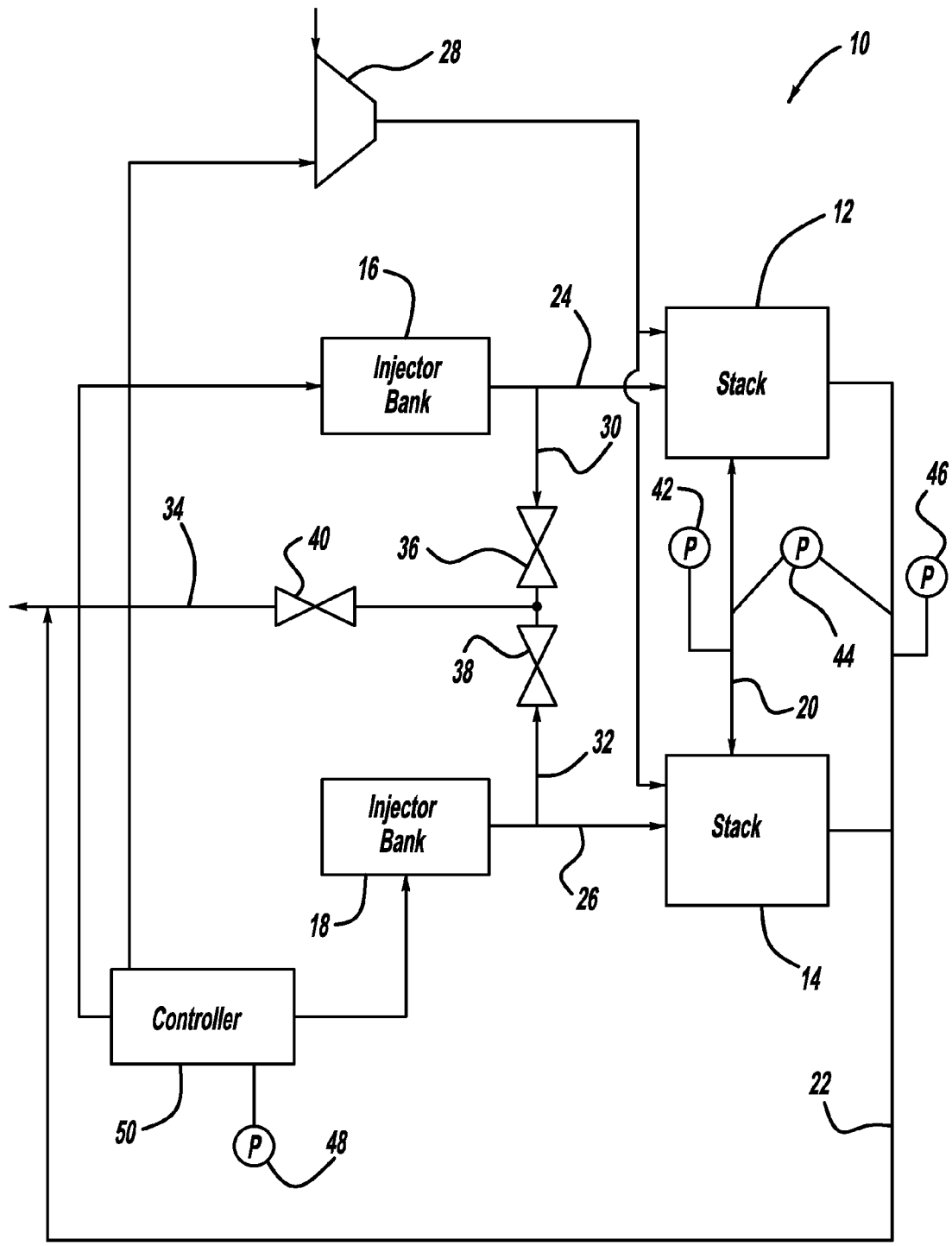
FIG. 1 is a schematic block diagram of the fuel cell system.

The following discussion of the embodiments of the invention directed to a method for determining whether an anode pressure sensor in a fuel cell stack is operating properly is merely exemplary in nature, and is in no way intended to limit the invention or its applications or uses.

FIG. 1 is a schematic block diagram of a fuel cell system 10 including split fuel cell sub-stacks 12 and 14 that operate under anode flow-shifting. When the flow is in one direction, an injector bank 16 injects fresh hydrogen into the anode side of the sub-stack 12 on an anode input line 24. Anode gas that is output from the sub-stack 12 is sent to the sub-stack 14 on a connecting line 20. Anode exhaust is output from the split sub-stack 14 on line 32 during anode bleeds when a bleed valve 38 is opened to direct the anode exhaust gas to output line 34. When the flow is in the opposite direction, an injector bank 18 injects fresh hydrogen into the anode side of the sub-stack 14 on an anode input line 26 that is output from the sub-stack 14 and sent to the sub-stack 12 on the line 20. Anode exhaust is output from the split sub-stack 12 on line 30 during anode bleeds when a bleed valve 36 is opened to direct the anode exhaust gas to the output line 34. An exhaust valve 40 is provided in the line 34 that is opened during the anode bleed and other times as may be required. Similarly, anode exhaust is output from the split sub-stack 14 on the line 32 during anode bleeds when a bleed valve 38 is opened to direct the anode exhaust gas to the output line 34.

The fuel cell system 10 further includes a compressor 28 that provides cathode air to the cathode side of the split sub-stacks 12 and 14 on a cathode input line. Cathode exhaust is output from the split sub-stacks 12 and 14 on a cathode exhaust gas line 22, which is combined with the anode exhaust in the line 34 and dilutes the hydrogen therein.

An anode pressure sensor 42 is provided in the connecting line 20 and measures the pressure in the anode side of the sub-stacks 12 and 14. A differential pressure sensor 44 is connected to the connecting line 20 and the cathode output line 22 and measures the differential pressure between the anode and the cathode of the sub-stacks 12 and 14. A cathode pressure sensor 46 is provided in the cathode output line 22 and measures the pressure in the cathode side of the sub-stacks 12 and 14. An ambient pressure sensor 48 is located in a region on the vehicle that is typically dry so that it does not freeze. A controller 50 controls the injector banks 16 and 18, the compressor 28, the anode exhaust bleed valves 36 and 38, and receives pressure measurement signals from the pressure sensors 42, 44, 46 and 48.

Prior to system start-up, the compressor 28 is generally not providing air to the cathode side of the split sub-stacks 12 and 14. Because the cathode is an open system, and because the compressor 28 is not providing airflow just prior to start-up, the cathode is at ambient pressure. Therefore, just before start-up, the controller 50 can use the ambient pressure sensor 48 and the differential pressure sensor 44 to determine whether the anode pressure sensor 42 is reading accurately, within some reasonable threshold. The cathode pressure sensor 46 will also be reading ambient pressure before the compressor 28 delivers cathode air to the sub-stacks 12 and 14, and thus, also could be used in combination with the differential pressure sensor 44 to determine if the anode pressure sensor 42 is operating properly. However, because the cathode pressure sensor 46 is also located in a wet environment, it is also subject to the same freeze conditions as the anode pressure sensor 42, and thus, it would not be known if the cathode pressure sensor 46 is providing an accurate reading. Because the ambient pressure sensor 48 is typically not located in a wet environment, it would not be subject to a freeze condition, and thus would not fail for this reason. The differential pressure sensor is utilized in a way that prevents freeze conditions from affecting the reliability of its readings.

The present invention proposes determining whether the anode pressure sensor 42 is providing an accurate reading in a freeze environment by comparing the reading from the anode pressure sensor 42 to the sum of the readings from the differential pressure sensor 44 and the ambient pressure sensor 48. Because the differential pressure sensor 44 measures the differential pressure between the cathode and anode and the cathode would be at ambient pressure prior to system start-up, then this relationship should hold true if all of the sensors are providing accurate readings. This diagnostic for determining whether the anode pressure sensor 42 is operating properly can be performed selectively during freeze conditions, or can be performed each time the system 10 is in a start-up condition.

The controller 50 can use the sum of the measurement from ambient pressure sensor 48 and the reading from the differential pressure sensor 44 to ensure the anode pressure sensor 42 is reading accurately, within some reasonable threshold. If it is not within a reasonable threshold, then the controller 50 will give an error signal. Ensuring the anode pressure sensor is reading accurately helps to avoid the problem of creating too much or too little pressure within the anode side of the stack, and thus potentially avoids breaking components in the stack, releasing excess hydrogen, or causing catalyst destruction.

For certain applications, such as automotive applications, the differential pressure sensor 44 may not be capable of providing a negative measurement. Therefore, for those times where the anode pressure may be below the cathode pressure in the sub-stacks 12 and 14, such as for example a vacuum being created in the anode side of the sub-stacks 12 and 14, the differential pressure sensor 44 may not give a proper reading. In such situations the differential pressure sensor 44 will simply provide an error signal indicating that the reading is below zero. If a negative anode pressure is detected, then the controller 50 will send hydrogen to the sub-stacks 12 and 14 to bring the anode side pressure up. Once the anode pressure is brought up to equal to or above the ambient pressure, and the differential pressure sensor 44 no longer reads an error or negative value, the system will stop injecting hydrogen to the anode and perform the pressure sensor check discussed above. Other ways to eliminate the vacuum in the anode side to give a positive anode pressure value are possible, such as opening the bleed valves 36 and 38, and valve 40, and will be readily apparent to those skilled in the art.

If the plausibility check as detailed above comes back with an implausible reading, the system 10 can substitute the cathode pressure sensor 46 minus the differential pressure sensor 44 for the anode pressure sensor 42 for fuel cell system control. If the sum of the differential pressure sensor 44 and the ambient pressure sensor 48 is the same as the anode pressure sensor 42, within some reasonable threshold, the anode pressure sensor 42 is determined to be reading accurately.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:
1. A fuel cell system comprising:
at least one fuel cell stack;
a hydrogen source providing hydrogen to the at least one fuel cell stack;

an anode pressure sensor for measuring the pressure of an anode side of the at least one fuel cell stack;

a differential pressure sensor for measuring the pressure difference between the anode side and a cathode side of the at least one fuel cell stack;

an ambient pressure sensor for measuring ambient pressure; and a controller responsive to pressure measurement signals from the anode pressure sensor, the differential pressure sensor and the ambient pressure sensor, said controller determining whether the anode pressure sensor is operating properly by comparing the anode pressure sensor measurement signal to a sum of the differential pressure sensor measurement signal and the ambient pressure sensor measurement signal.

2. The system according to claim 1 wherein the controller determines if the anode pressure sensor is operating properly if the controller determines that the anode pressure sensor may be in a freeze condition.

3. The system according to claim 1 wherein the ambient pressure sensor is located in a dry environment.

4. The system according to claim 1 further comprising a compressor for providing cathode air to the at least one fuel cell stack, said controller determining whether the anode pressure sensor is operating properly at system start-up prior to the compressor providing the cathode air to the at least one fuel cell stack when the cathode side of the at least one fuel cell stack is at ambient pressure.

5. The system according to claim 4 wherein the ambient pressure sensor is a pressure sensor that measures the pressure of the cathode side of the at least one fuel cell stack.

6. The system according to claim 1 wherein the controller causes the hydrogen source to provide hydrogen to the at least one fuel cell stack to raise the pressure of the anode side of the at least one fuel cell stack to be equal to or above the pressure of the cathode side of the at least one fuel cell stack prior to determining whether the anode pressure sensor is operating properly if the controller determines that the cathode side pressure is higher than the anode side pressure.

7. The system according to claim 1 wherein the at least one fuel cell stack is a first and second split sub-stack where the anode side of the sub-stacks are connected by a connecting line, said anode pressure sensor measuring the pressure in the anode side of the sub-stacks in the connecting line.

8. A fuel cell system comprising:
at least one fuel cell stack;
a hydrogen source providing hydrogen to an anode side of the at least one fuel cell stack;
a compressor for providing an airflow to a cathode side of the at least one fuel cell stack;
an anode pressure sensor for measuring the pressure of the anode side of the at least one fuel cell stack;
a differential pressure sensor for measuring the pressure difference between the anode side and the cathode side of the at least one fuel cell stack;
an ambient pressure sensor for measuring ambient pressure, said ambient pressure sensor being positioned in a dry environment; and
a controller responsive to pressure measurement signals from the anode pressure sensor, the differential pressure sensor and the ambient pressure sensor, said controller determining whether the anode pressure sensor is providing an accurate pressure measurement at system start-up prior to the compressor providing the cathode airflow to the at least one fuel cell stack when the cathode side of the at least one fuel cell stack is at ambient pressure by comparing the anode pressure sensor measurement signal to a sum of the differential pressure sensor measurement signal and the ambient pressure sensor measurement signal.

9. The system according to claim 8 wherein the controller determines if the anode pressure sensor is operating properly if the controller determines that the anode pressure sensor may be in a freeze condition.

10. The system according to claim 8 wherein the controller causes the hydrogen source to provide hydrogen to the at least one fuel cell stack to raise the pressure of the anode side of the at least one fuel cell stack to be equal to or above the pressure of the cathode side of the at least one fuel cell stack prior to determining whether the anode pressure sensor is operating properly if the controller determines that the cathode side pressure is higher than the anode side pressure.

11. The system according to claim 8 wherein the at least one fuel cell stack is a first and second split sub-stack where the anode side of the sub-stacks are connected by a connecting line, said anode pressure sensor measuring the pressure in the anode side of the sub-stacks in the connecting line.

12. A method for determining whether an anode pressure sensor that measures the pressure in an anode side of a fuel cell stack is providing an accurate pressure sensor reading, said method comprising:
measuring ambient pressure;
measuring a differential pressure between a cathode side of the fuel cell stack and the anode side of the fuel cell stack;
adding the ambient pressure measurement and the differential pressure measurement; and
determining whether the added differential pressure measurement and the ambient pressure measurement is the same or nearly the same as the anode pressure sensor measurement.

13. The method according to claim 12 wherein measuring ambient pressure includes using an ambient pressure sensor located in a dry environment.

14. The method according to claim 12 wherein measuring ambient pressure includes using a cathode pressure sensor in the cathode side of the fuel cell stack when the cathode side is open to ambient.

15. The method according to claim 12 further comprising adding hydrogen to the anode side of the fuel cell stack if the differential pressure between the anode side and the cathode side indicates that the cathode side pressure is higher than the anode side pressure.

* * * * *